United States Patent [19]
Bradus

[11] Patent Number: 5,805,068
[45] Date of Patent: Sep. 8, 1998

[54] CORDLESS DEVICE WITH BATTERY IMBALANCE INDICATOR

[75] Inventor: Robert Bradus, Bel Air, Md.

[73] Assignee: Black & Decker Inc., Newark, Del.

[21] Appl. No.: 519,382

[22] Filed: Aug. 25, 1995

[51] Int. Cl.⁶ ................................................. G08B 21/00
[52] U.S. Cl. .......................... 340/636; 340/661; 340/663; 324/433; 324/434
[58] Field of Search .................... 340/636, 660, 340/661, 663; 324/433, 434

[56] References Cited

U.S. PATENT DOCUMENTS

| | | | |
|---|---|---|---|
| 3,872,457 | 3/1975 | Ray et al. | 340/636 |
| 4,134,060 | 1/1979 | Feldman | 324/29.5 |
| 4,198,597 | 4/1980 | Sawyer | 340/636 |
| 4,316,185 | 2/1982 | Watrous et al. | 340/636 |
| 4,316,188 | 2/1982 | Watrous et al. | 340/636 |
| 4,424,491 | 1/1984 | Bobbett et al. | 324/433 |
| 4,536,757 | 8/1985 | Ijntema | 340/636 |
| 4,575,680 | 3/1986 | Gold | 340/636 |
| 4,618,857 | 10/1986 | Dubois et al. | 340/636 |
| 4,622,508 | 11/1986 | Matteau et al. | 320/13 |
| 4,665,370 | 5/1987 | Holland | 324/429 |
| 4,823,086 | 4/1989 | Whitmire et al. | 324/434 |
| 4,967,136 | 10/1990 | Nofzinger | 320/6 |
| 4,990,885 | 2/1991 | Irick et al. | 340/636 |
| 5,028,858 | 7/1991 | Schnizler et al. | 320/2 |
| 5,099,211 | 3/1992 | Nowak | 340/636 |
| 5,156,928 | 10/1992 | Kawasaki | 429/23 |
| 5,175,531 | 12/1992 | Whitmire et al. | 340/636 |
| 5,302,902 | 4/1994 | Groehl | 324/434 |

FOREIGN PATENT DOCUMENTS

| | | |
|---|---|---|
| 0691725A | 1/1996 | European Pat. Off. . |
| WO90/10334A | 9/1990 | WIPO . |

OTHER PUBLICATIONS

Pat. Abstracts of Japan, pub. No. 05052914, Pub.: Mar. 2, 1993, Applic. No. 03237032.

*Primary Examiner*—Brent A. Swarthout
*Assistant Examiner*—Van T. Trieu
*Attorney, Agent, or Firm*—Dennis A. Dearing; John D. Del Ponti; Charles E. Yocum

[57] ABSTRACT

A cordless device 11 comprises a load 13 and a multiple pack power supply 15 connected to load 13. A voltage detection circuit 23, 63, 64, 75, 76 is connected to supply 15 and detects when one of the batteries 17, 19 is charged and the other is discharged. Circuits 23, 63, 65, 75, 76 may also function as a voltage comparator circuit to identify when one of the batteries 17, 19 is defective. The detection or comparator circuit includes comparators 25, 33 for comparing the battery voltages. An indicator 41, 43, 65, 74, 81 is connected to the output of comparators 25, 33 and provides an end user identifiable signal responsive to the outputs of comparators 25, 33.

24 Claims, 5 Drawing Sheets

CORDLESS DEVICE WITH BATTERY IMBALANCE INDICATOR

BACKGROUND OF THE INVENTION

This invention relates to a battery operated ("cordless") device such as a power tool, light, kitchen appliance or toy. And, more specifically, it relates to such a device that is powered by a power supply having (a) at least two discrete batteries or battery packs or (b) a single battery that is electrically connectable in the load circuit for operation at more than one output voltage.

Conventional cordless devices such as power tools may be powered by two discrete batteries or battery packs rather than a single battery pack. This approach has been adopted so that a common battery pack size may be used for both high power and low power applications. In the high power applications using two or more battery packs simultaneously, a user may insert into the tool packs having different or ("imbalanced") charge states. If one of the packs has a reasonable amount of charge and the second is essentially discharged, the first pack will continue to operate the tool and drive the second pack into a reverse state of charge. As a result, the second pack may be damaged.

The problem of a battery power supply with an imbalanced charge state also arises in conventional cordless devices that utilize a single battery or battery pack that is operated at two or more output voltages. For example, to provide a cordless drill with two output motor speeds, a six cell 7.2 volt nickel-cadmium battery pack may be used. To provide a low speed, three of the six cells are connected to the load. To provide a high speed setting, all six cells are connected to the load. Thus, if a tool is operated for a significant period in the low speed setting and is then operated in the high speed setting, the three cells will have an imbalanced charge state compared to the remaining three cells of the pack. Then, if the tool is operated in the high speed setting without recharging of the pack, the three cells having the lower charge state may be reversed charged and potentially damaged.

SUMMARY OF THE INVENTION

Accordingly, a primary object of the present invention is to provide a cordless device that is operated with a power supply utilizing multiple packs with a circuit for detecting the discharged state of one pack within the power supply while other packs in the supply remain in a substantially charged state. A second object of the present invention is to provide a cordless device utilizing a multiple pack power supply with a circuit for indicating when there is a significant difference in voltage between two packs within the supply.

According to one aspect of the invention, the device comprises a load and a multiple pack power supply connected to the load. A voltage detection circuit is connected to the power supply and detects when one of the batteries or packs is charged and the other is substantially discharged.

The detection circuit preferably comprises a first comparator that receives a voltage input proportional to the sum of the voltages of the first and second battery at its plus input and receives a voltage input proportional to the voltage of the second battery at its negative input. The first comparator generates a first output signal when the second battery voltage exceeds the first battery voltage by a predetermined amount proportionate to the voltage sum.

The detection circuit also preferably comprises a second comparator for receiving a voltage input proportional to the second battery voltage at its plus input and for receiving a voltage input proportional to the sum of the first and second battery voltage at its negative input. The second comparator generates a second output when the first battery voltage exceeds the second battery voltage by the predetermined amount proportionate to the voltage sum.

An indicator is preferably connected to the outputs of the first and second comparator, respectively, and generate a signal responsive, respectively, to the first and second output signals. As a result, an indication is provided when either of the second or first battery is substantially discharged while the other is charged. The indicator may take a variety of forms including a visual indicator such as an LED and a switching device such as a relay or FET for disabling operation of the cordless device.

In accordance with a second aspect of the invention, a cordless device comprises a load and a multiple pack power supply connected to the load and a voltage comparator circuit connected to the power supply. The circuit compares the sum of the voltages of the first and second batteries to the voltage of the second battery and generates a signal when the difference between the voltage sum and second battery voltage exceeds a predetermined absolute value proportionate to the voltage sum.

The comparator circuit preferably comprises first and second comparators. The first comparator generates a signal when the second battery voltage exceeds the voltage sum by a predetermined proportionate value. The second comparator generates a signal when the voltage sum exceeds the second battery voltage by the predetermined proportionate value. The signals are preferably fed to a visual or switching indicator.

The predetermined proportionate value preferably corresponds to the difference between the sum of the pack voltages and one pack voltage when one pack is charged and the other is discharged or defective.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of, this specification illustrate five embodiments of the invention and together with the description serve to explain the principles of the invention. In the drawings, the same reference numerals indicate the same parts.

DESCRIPTION OF THE PREFERRED EMBODIMENTS

Figure 1:
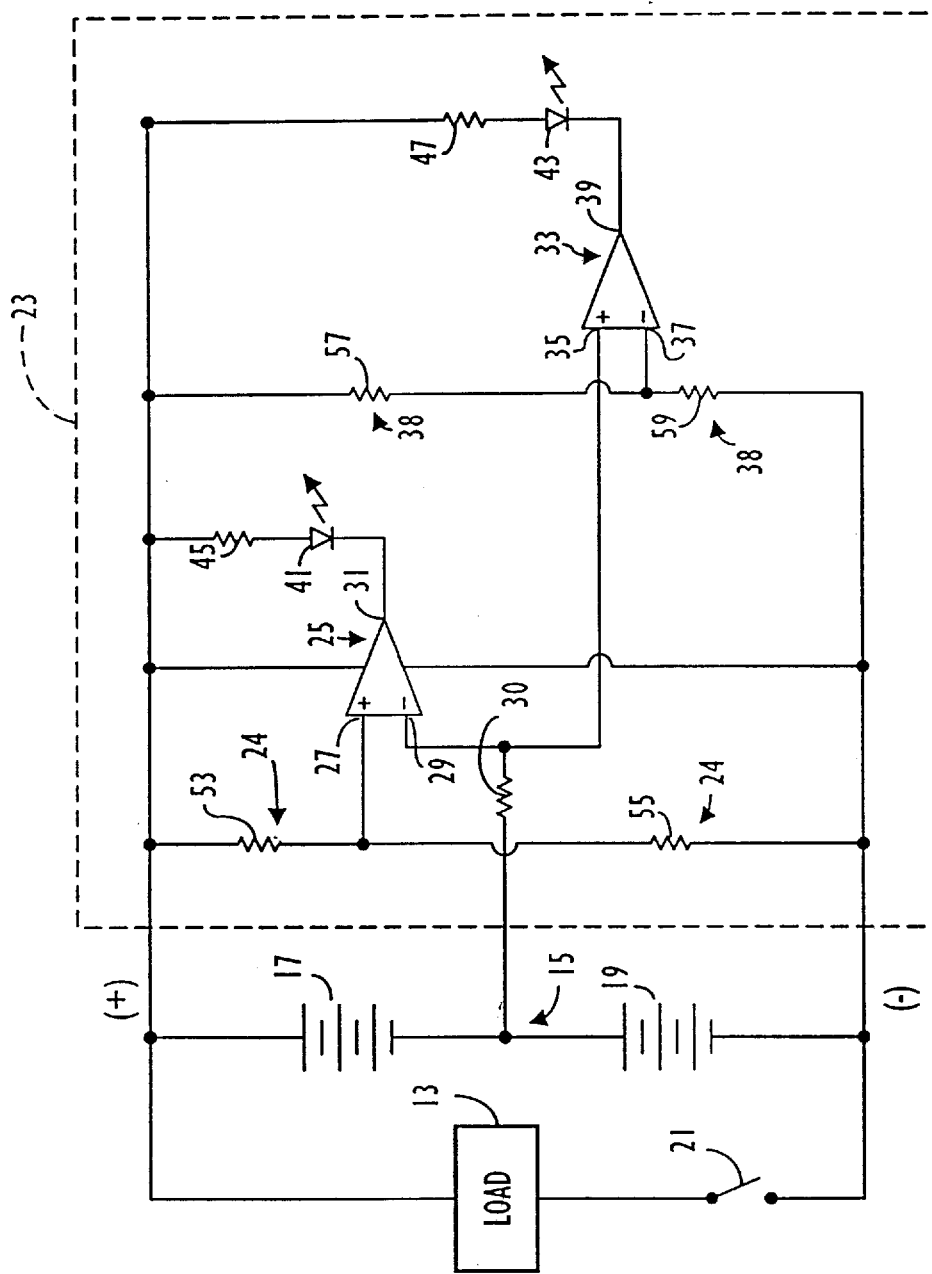
FIG. 1 shows an electrical schematic of a cordless device in accordance with a preferred first embodiment of the present invention.

FIG. 1 shows an electrical schematic of a preferred embodiment of a cordless device in accordance with a preferred embodiment of the present invention. The device 11 may be constituted by any of a wide range of cordless devices such as power tools, kitchen appliances, toys and lights. Device 11 includes a load 13 which is comprised of a motor (e.g., permanent magnet or universal motor) when the device is a power tool or kitchen appliance such as a vacuum. If device 11 is a light, load 13 comprises a light bulb.

According to the present invention, device 11 further comprises a multiple battery or battery pack power supply. Supply 15 may take a variety of forms. One form (shown schematically in FIGS. 2–5) is a conventional integral or detachable battery pack such as is commonly used in power tools to provide multiple output voltages to provide two speed settings. In the first speed setting, only some of the cells of the pack are connected to the load. In the second setting, all of the cells are connected to the load. As discussed herein, such a multiple output voltage battery power supply will be identified simply as a supply with two or more batteries as it is wired to use different groupings of the cells as the supply. Also, the terms "pack" and "battery" are used synonymously to mean a grouping of cells that may be integral with or detachable from the cordless device.

A second form of supply 15 comprising two ("first" and "second") detachable packs 17, 19 is illustrated in FIG. 1. Power supply 15 is connected to load 13 through an on/off switch 21 and provides a single output voltage to load 13.

For explanation of the invention, the cells of packs 17, 19 will be considered to have nickel-cadmium cells that are commonly used in many cordless devices requiring high discharge rates. Other rechargeable cells may, of course, be used. When fully or partially charged a Ni-Cd cell has a nominal output voltage of 1.2 volts. The term "charged" will be used to describe a cell or pack that is at least partially charged.

According to the present invention, device 11 further comprises a detection circuit 23 that is connected to power supply 15 and is for detecting when one of the packs 17, 19 is charged and the other of the packs 17, 19 is substantially discharged.

Detection circuit 23 preferably comprises a first comparator 25 to detect when pack 17 is substantially discharged. Comparator 25 has a positive input 27 connected in circuit with first and second packs 17, 19 for receiving a voltage input proportional, and in this instance equal, to the sum of the pack voltages. As will be explained below, the voltage input to positive input 27 is attenuated through a voltage divider 24. A second negative input 29 is connected to the second pack 19 through current limiting resistor 30 and receives a voltage input proportional, and in this instance equal, to the second pack voltage. Through divider 24, comparator 25 generates a first output signal on open collector output 31 when the second pack voltage exceeds the first pack voltage by a predetermined amount proportionate to the sum of the voltages of packs 17, 19. When both packs 17, 19 are charged and the voltages are substantially equal, the output of comparator 25 is high (open). And, when the voltage difference exceeds the predetermined amount, the output of comparator 25 is switched low. In the instance of nickel-cadmium battery packs the output voltage of packs 17, 19 when charged is approximately 3.6 volts per pack. The output voltage of a substantially discharged pack is approximately equal to or less than 3 volts. Accordingly, the predetermined voltage difference may be set at about 0.6 volts through divider 24.

Circuit 23 further comprises a second comparator 33 to detect when pack 19 is substantially discharged. Comparator 33 has a positive input 35 connected in circuit with second pack 19 through current limiting resistor 30 for receiving a voltage input proportional, and in this instance equal, to the second battery voltage. A negative input 37 is connected to first pack 17 and receives a voltage input proportional to the sum of the first and second battery voltages. As will be explained below, the voltage input to negative input 37 is attenuated through a divider 38. Through attenuation of the voltage input to input 37, second comparator 33 generates a second output signal when the first pack voltage exceeds the second pack voltage by a predetermined amount proportionate to the sum of the voltages of packs 17, 19. Comparator 33 operates similarly to comparator 25. Namely, comparator 33 has a high (open) output when the voltages of pack 17 and 19 are substantially equal. When the voltage of pack 17 is charged and exceeds pack 19 by a predetermined amount corresponding to a substantially discharged state of pack 19, comparator 33 is switched low at output 39. As before, the voltage differential in the case of a nickel-cadmium battery packs may be approximately 0.6 volts corresponding to a 3.6 voltage of pack 19 indicating a charged state and a voltage of 3 volts for pack 17 indicating a discharged state.

Comparators 25, 33 are preferably constituted by an LM393 integrated circuit marketed, e.g., by Motorola, National Semiconductor, and Texas Instruments.

Detection circuit 23 further comprises a first indicator 41 connected to output 31 of comparator 25 to signal that pack 17 is substantially discharged responsive to the output signal of comparator 25. A second indicator 43 is connected to the output 39 of comparator 33 to signal that pack 19 is substantially discharged responsive to the output signal from comparator 33. Preferably, indicators 41, 43 are LEDs that are connected to supply 15 through resistors 45, 47. LED 41 is off when comparator output 25 is high (open) indicating that packs 17, 19 are charged. LED 41 is switched on when the output of comparator 25 is low indicating that pack 17 is substantially discharged and pack 19 is charged. Similarly, LED 43 is off and on indicating, respectively, when both packs 17, 19 are charged and when pack 19 is discharged and pack 17 is charged.

Detection circuit 23 further comprises first voltage divider 24 connected in circuit with packs 17, 19 and comparator plus input 27. Divider 24 attenuates the voltage input to comparator plus input 27 to transition from greater than to less than the voltage input to comparator negative input 29 when the voltage of pack 19 exceeds the voltage of pack 17 by the predetermined amount. A second voltage divider 38 is connected in circuit with packs 17, 19 and the second comparator negative input 37. Divider 38 attenuates the voltage input to the second comparator negative input to transition from less than to greater than the voltage input to the second comparator plus input 35 when the voltage of pack 17 exceeds the voltage of pack 19 by the predetermined amount. Voltage divider 49 comprises individual resistors 53, 55 with plus input 27 connected to the common junction of resistors 53, 55. Divider 51 comprises individual resistors 57, 59 with negative input 37 connected to the common junction of resistors 57, 59.

Dividers 24, 38 are configured to provide for resetting of comparators 25, 33 from high to low in the following manner. Divider 24 is configured on the assumption that pack 19 is charged and pack 17 is discharged. Thus, supply 15 has a 6.6 volt output based on pack 19 being charged and having a 3.6 volt output and pack 17 being discharged and having a 3.0 volt output. Under these conditions, divider 24 is configured to provide a reference voltage input to plus input 27 of slightly less than 3.6 volts.

Divider 38 is configured on the assumption that pack 19 is discharged and pack 17 is charged. Thus, supply 15 has a 6.6 volt output based on pack 19 being discharged and having a 3.0 volt output and pack 17 being charged and having a 3.6 volt output. Under these conditions, divider 51 is configured to provide a reference voltage input to the negative input 37 of comparator 33 of slightly greater than 3.0 volts.

Thus, first comparator 25 generates a signal when the voltage of second pack 19 exceeds the voltage of second pack 17 by a predetermined value of about 0.6 volts (based on a nominal supply voltage of 6.6 volts). Second comparator 33 generates a signal when the voltage of first pack 17 exceeds the voltage of second pack 19 by the predetermined value of about 0.6 volts (based on a nominal supply voltage of 6.6 volts). The predetermined value of about 0.6 volts corresponds to the difference in voltage between batteries 17, 19 when one is charged and the other is discharged.

In operation, device 11 includes a load 13 such as a motor that is powered by power supply 15 through on/off switch 21. Power supply 15 consists of two detachable packs 17, 19 which, as loaded into device 11, may have two different charge levels. A charge imbalance may also arise with a multiple voltage supply (not shown) by extensive use of the supply at a low voltage setting as explained in more detail in the background. If one of the packs 17, 19 is initially discharged or is discharged in use of device 11 before the discharge of the second pack, the pack that is discharged first may be reversed charged through the continued operation of device 11 with the remaining pack that is still charged. Reverse charging of the pack may lead to damage of the pack. Accordingly, it is desired to either disable device 11 or to signal the user when one of the packs is discharged and the other is charged.

To better illustrate the operation of comparators 25, 33 and voltage dividers 24, 38, the following table gives the voltage inputs and outputs for comparators 25, 33.

VOLTAGE INPUTS AND OUTPUTS FOR COMPARATORS 25, 33

| 1 | A<br>Pack 17<br>Voltage (V) | B<br>Pack 19<br>Voltage (V) | C<br>Voltage Sum<br>(V) of Packs<br>17, 19 | D<br>Voltage<br>Input to<br>Comp. 25+ | E<br>Voltage<br>Input to<br>Comp. 25− | F<br>Comp. 25<br>Output | G<br>Voltage<br>Input to<br>Comp. 33+ | H<br>Voltage<br>Input to<br>Comp. 33− | I<br>Comp. 33<br>Output |
|---|---|---|---|---|---|---|---|---|---|
| 2 | | | | | | | | | |
| 3 | 3.60 | 3.60 | 7.20 | 3.9000 | 3.6000 | 1 | 3.6000 | 3.3000 | 1 |
| 4 | 3.60 | 3.50 | 7.10 | 3.8458 | 3.5000 | 1 | 3.5000 | 3.2542 | 1 |
| 5 | 3.60 | 3.40 | 7.00 | 3.7917 | 3.4000 | 1 | 3.4000 | 3.2083 | 1 |
| 6 | 3.60 | 3.30 | 6.90 | 3.7375 | 3.3000 | 1 | 3.3000 | 3.1625 | 1 |
| 7 | 3.60 | 3.20 | 6.80 | 3.6833 | 3.2000 | 1 | 3.2000 | 3.1167 | 1 |
| 8 | 3.60 | 3.10 | 6.70 | 3.6292 | 3.1000 | 1 | 3.1000 | 3.0708 | 1 |
| 9 | 3.60 | 3.00 | 6.60 | 3.5750 | 3.0000 | 1 | 3.0000 | 3.0250 | 0 |
| 10 | 3.60 | 2.90 | 6.50 | 3.5208 | 2.9000 | 1 | 2.9000 | 2.9792 | 0 |
| 11 | 3.60 | 2.80 | 6.40 | 3.4667 | 2.8000 | 1 | 2.8000 | 2.9333 | 0 |
| 12 | 3.60 | 2.70 | 6.30 | 3.4125 | 2.7000 | 1 | 2.7000 | 2.8875 | 0 |
| 13 | 3.60 | 2.60 | 6.20 | 3.3583 | 2.6000 | 1 | 2.6000 | 2.8417 | 0 |
| 14 | 3.60 | 2.50 | 6.10 | 3.3042 | 2.5000 | 1 | 2.5000 | 2.7958 | 0 |
| 15 | | | | | | | | | |
| 16 | 3.60 | 3.60 | 7.20 | 3.9000 | 3.6000 | 1 | 3.6000 | 3.3000 | 1 |
| 17 | 3.50 | 3.60 | 7.10 | 3.8458 | 3.6000 | 1 | 3.6000 | 3.2542 | 1 |
| 18 | 3.40 | 3.60 | 7.00 | 3.7917 | 3.6000 | 1 | 3.6000 | 3.2083 | 1 |
| 19 | 3.30 | 3.60 | 6.90 | 3.7375 | 3.6000 | 1 | 3.6000 | 3.1625 | 1 |
| 20 | 3.20 | 3.60 | 6.80 | 3.6833 | 3.6000 | 1 | 3.6000 | 3.1167 | 1 |
| 21 | 3.10 | 3.60 | 6.70 | 3.6292 | 3.6000 | 1 | 3.6000 | 3.0708 | 1 |
| 22 | 3.00 | 3.60 | 6.60 | 3.5750 | 3.6000 | 0 | 3.6000 | 3.0250 | 1 |
| 23 | 2.90 | 3.60 | 6.50 | 3.5208 | 3.6000 | 0 | 3.6000 | 2.9792 | 1 |
| 24 | 2.80 | 3.60 | 6.40 | 3.4667 | 3.6000 | 0 | 3.6000 | 2.9333 | 1 |
| 25 | 2.70 | 3.60 | 6.30 | 3.4125 | 3.6000 | 0 | 3.6000 | 2.8875 | 1 |
| 26 | 2.60 | 3.60 | 6.20 | 3.3583 | 3.6000 | 0 | 3.6000 | 2.8417 | 1 |
| 27 | 2.50 | 3.60 | 6.10 | 3.3042 | 3.6000 | 0 | 3.6000 | 2.7958 | 1 |

The data in columns D and H has been calculated using the following resistance values for dividers 24, 38: resistor 53—33 kohms, resistor 55—39 kohms, resistor 57—39 kohms and resistor 59—33 kohms.

The data in rows 3–14 has been calculated based on (a) pack 17 (Column A) being charged and having a nominal voltage of 3.6 volts and (b) pack 19 (Column B) having a range of output voltages between 3.6 volts and 2.5 volts. The voltage range of pack 19 indicates that pack 19 has changed from a charged condition to a discharged condition while pack 17 is charged. As may be seen, comparator 25 remains high (Column F) for all these values and comparator 33 switches from high to low (Column I) when the voltage of pack 19 drops below about 3.0 volts.

The data in rows 16–27 has been calculated based on (a) pack 19 (Column B) being charged and having a nominal voltage of 3.6 volts and (b) pack 17 (Column A) having a range of voltage between 3.6 volts and 2.5 volts. The voltage range indicates that pack 17 has changed from a charged condition to a discharged condition while pack 19 is charged. As may be seen, comparator 33 remains high (Column I) for all these values and comparator 25 switches from high to low (Column F) when the voltage of pack 17 drops below about 3.0 volts.

Comparator 25 detects when pack 19 is charged and pack 17 is substantially discharged. When packs 17, 19 are both charged and have a total output voltage of 7.2 volts, a reference voltage of 3.9 volts is applied to the plus input 27 through voltage divider 24. If there is a charge imbalance between pack 17 and pack 19 and pack 17 becomes substantially discharged, the output voltage applied by supply 15 to divider 24 is reduced to 6.6 volts based on pack 19 being charged and having a 3.6 output voltage and pack 17 being substantially discharged and reaching a 3.0 output voltage. The referenced voltage is now set at about 3.6 volts on plus input 27 compared to the voltage of about 3.6 volts applied to negative input 29. When the output voltage of pack 17 is equal to or less than 3 volts, comparator 25 is reset to low. The voltage of pack 19 is applied to negative input 29 through current limiting resistor 50. When the output of comparator 25 is low, LED 41 is on providing an indication that pack 17 is discharged.

Comparator 33 detects when pack 19 is substantially discharged and pack 17 is charged. When packs 17, 19 are both charged and have a total output voltage of 7.2 volts, a reference voltage of 3.3 volts is applied to negative input 37 through voltage divider 51. If there is a charge imbalance between pack 17 and pack 19 and pack 19 becomes substantially discharged, the output voltage applied by supply 15 to divider 51 is reduced to 6.6 volts based on pack 17 being charged and having a 3.6 volt output voltage and pack 19 being substantially discharged and reaching a 3.0 output voltage. The reference voltage on negative input 37 is now set at slightly over 3 volts compared to a 3.0 volt input on positive input 35 from pack 19. Thus, when the output voltage of pack 19 is equal to or less than 3 volts, comparator 33 is reset to low. When the output of comparator 33 is low, LED 43 is on providing an indication that pack 17 is discharged.

An indicator responsive to the output of comparators 25, 33 may be accomplished in a variety of forms using both (a) visible indicators such as an LED and (b) electromechanical and solid state switching devices. Examples of such indicators are shown in the embodiments of the present invention shown in FIGS. 2–5. In the drawings, the same reference numeral indicate the same parts. Also, the embodiments of FIGS. 2–5 have power supply/load circuits typical of those used in some power tool applications described above. Namely, the load is a motor 60. And, the control switch for the supply load circuit is a two speed reversing switch 61. Supply 15 can thus function as multiple output voltage supply as described above and may be configured as (a) a single integral or detachable 7.2 volt pack or two detachable 3.6 volt packs. Motor 60 is reversibly drivable by using switch 61 to reverse the polarity of the connection of supply 15 to motor 60.

Figure 2:
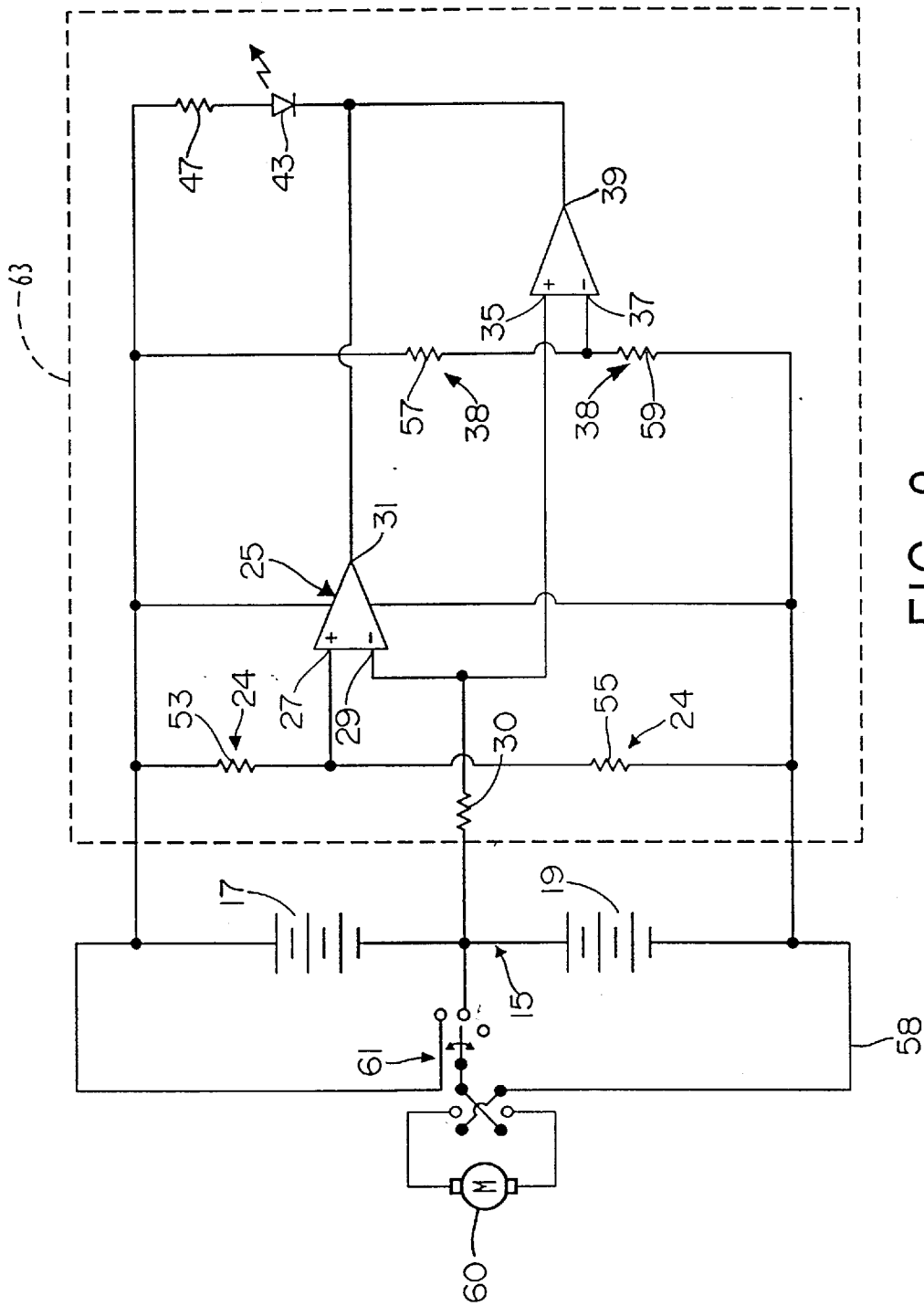
FIG. 2 shows an electrical schematic of a cordless device in accordance with a second embodiment of the present invention.

FIG. 2 shows an alternative embodiment of the present invention similar to the first embodiment shown in FIG. 1. The embodiment shown in FIG. 2 is identical in construction and operation to the embodiment of FIG. 1 except that (a) the supply/load circuit 58 has been modified as described above and (b) in FIG. 2, a single LED indicator 43 is used in place of two LED indicators 41, 43 in FIG. 1. In operation, the outputs 31, 39 of comparators 25, 33 are an open collector type. When the output of either comparator 25 or comparator 33 is set low, LED 43 is lit indicating that one of the packs 17, 19 is substantially discharged and that the remaining pack is charged.

Figure 3:
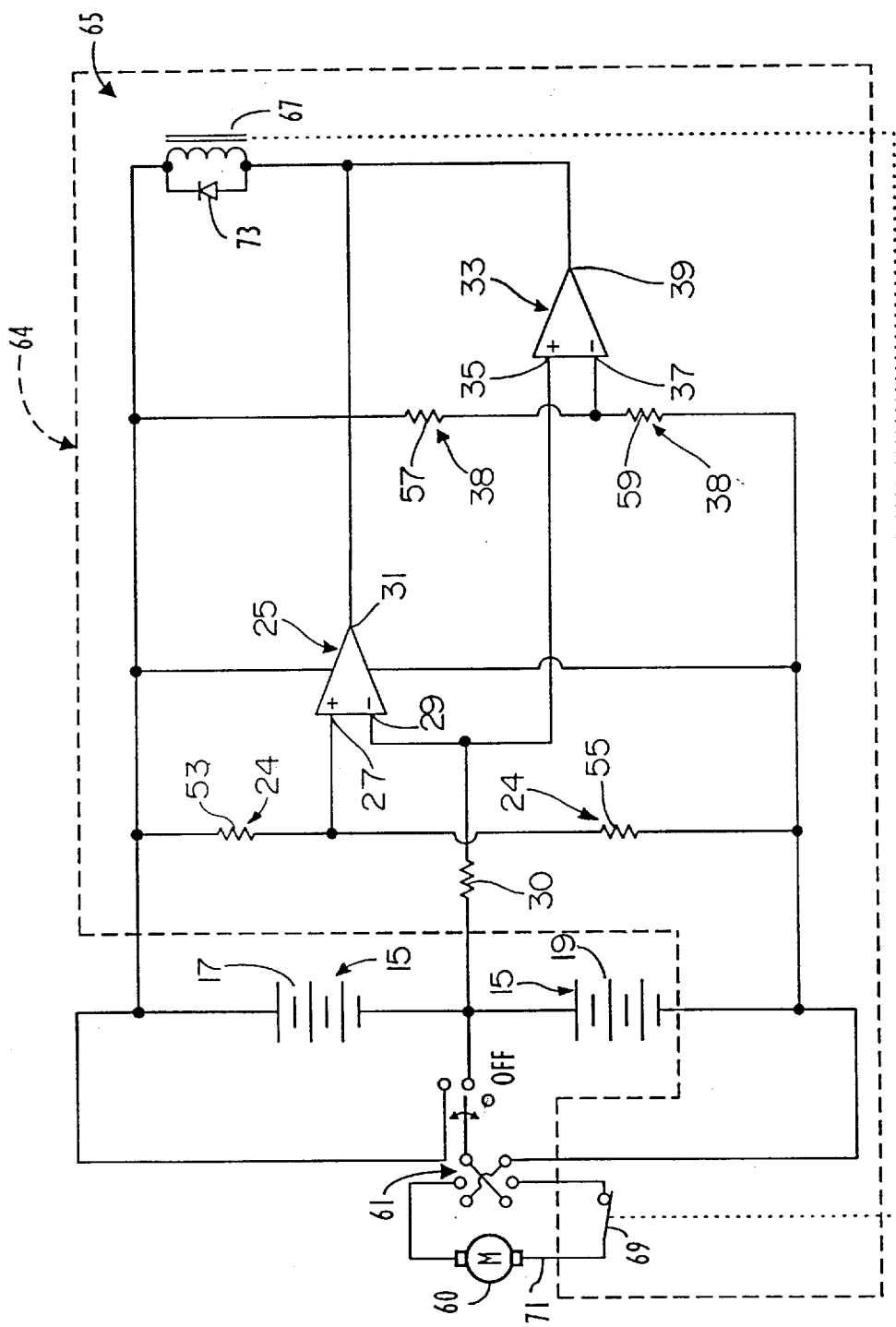
FIG. 3 shows an electrical schematic of a cordless device in accordance with a third embodiment of the present invention.

FIG. 3 shows a third embodiment of the present invention. The third embodiment is identical in construction and function to the second embodiment shown in FIG. 2 except that in the circuit 23 (FIG. 2) LED indicator 43 and current limiting resistor 47 are replaced in circuit 64 (FIG. 3) by a switching device 65 or a means 65 for disabling device 11 if packs 17, 19 have an imbalanced charge state. Disabling means 65 comprises a relay including a relay coil 67 connected to the outputs of comparators 25, 33 and a normally closed relay contact 69 connected in the power supply and load circuit 71. A free wheeling diode 73 is connected across relay coil 67. In operation, relay contact 69 is normally closed when the output of comparators 25, 33 are both set high causing relay coil 67 to be essentially open circuited. When either comparator 25 or comparator 33 is set low, current flows through coil 67 and opens normally closed relay contact 69. As a result, the flow of current to load 13 from supply 15 is interrupted. Free wheeling diode 73 provides a path for inductive current to flow when the comparator output is reset from low to high thereby turning off relay coil 67. The third embodiment shown in FIG. 3 assumes that the current required to activate relay coil 67 can be handled by the outputs 31, 39 of comparators 25, 33.

Figure 4:
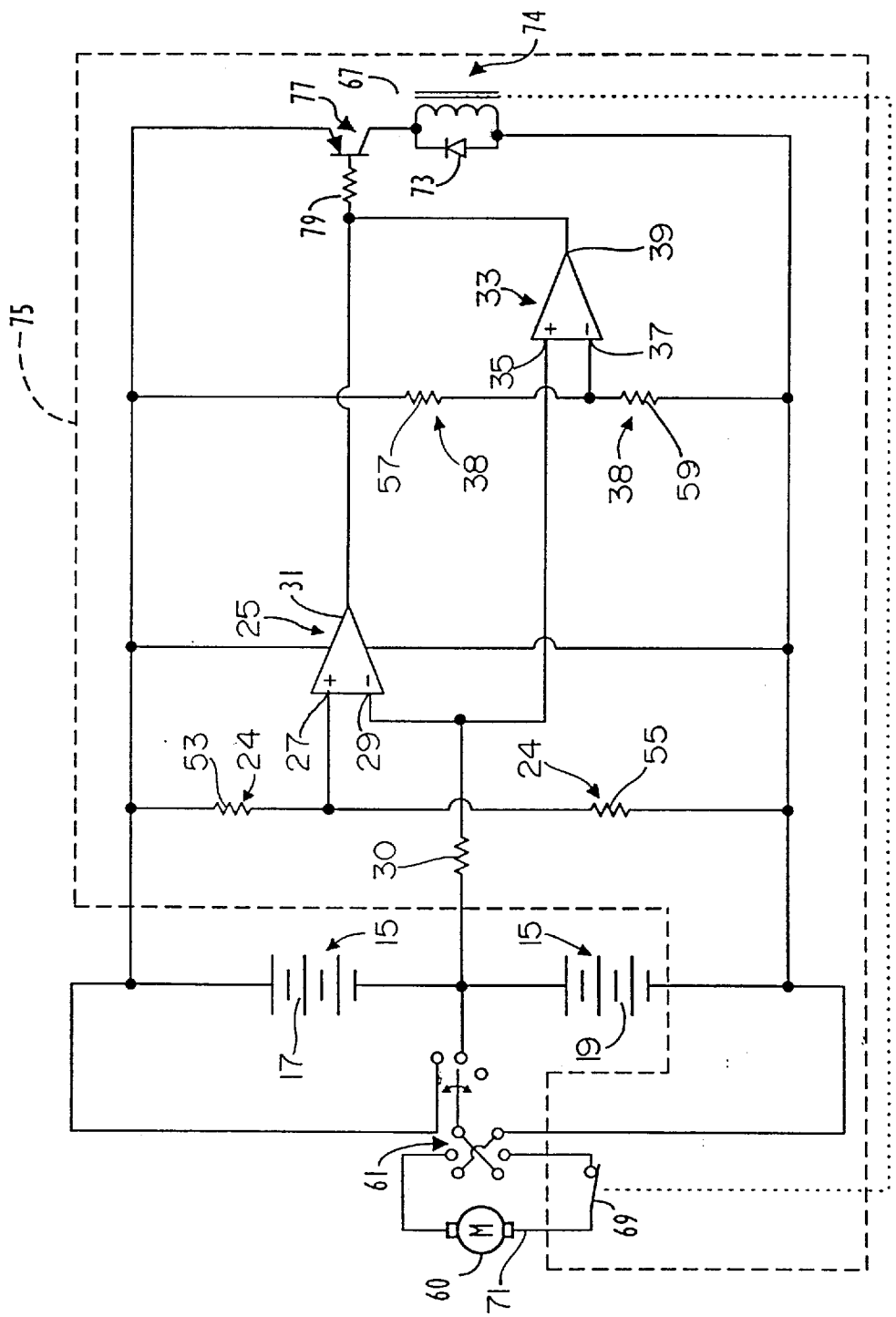
FIG. 4 shows an electrical schematic of a cordless device in accordance with a fourth embodiment of the present invention.

FIG. 4 shows a fourth embodiment of the present invention for use if the relay coil current exceeds the capacity of comparators 25, 33. The fourth embodiment is identical to the third embodiment shown in FIG. 3 except that in FIG. 4 a disabling means 74 for a detection circuit 75 includes a PNP transistor 77 and a current limiting resistor 79. The outputs 31, 39 of comparators 25, 33 are connected to the base of transistor 77 through current limiting resistor 79. Transistor 77 and resistor 79 limit current flow to comparators 25, 33 if the current required to activate relay coil 67 is more than can be handled by comparators 25, 33 in the third embodiment shown in FIG. 3. The current for energizing relay coil 67 now flows through emitter/collector circuit of transistor 77 rather than to comparators 25, 33.

In operation, when the outputs from comparators 25, 33 are both high indicating that packs 17, 19 have a balanced state of charge, no current flows through the base of transistor 77, biasing transistor 77 off. If packs 17, 19 have an imbalanced state of charge and one of the packs becomes substantially discharged, the output from either comparator 25 or comparator 33 will be low. As a result, current will be drawn through the base of transistor 77 biasing transistor 77 conductive and relay coil 67 is energized opening contacts 69.

Figure 5:
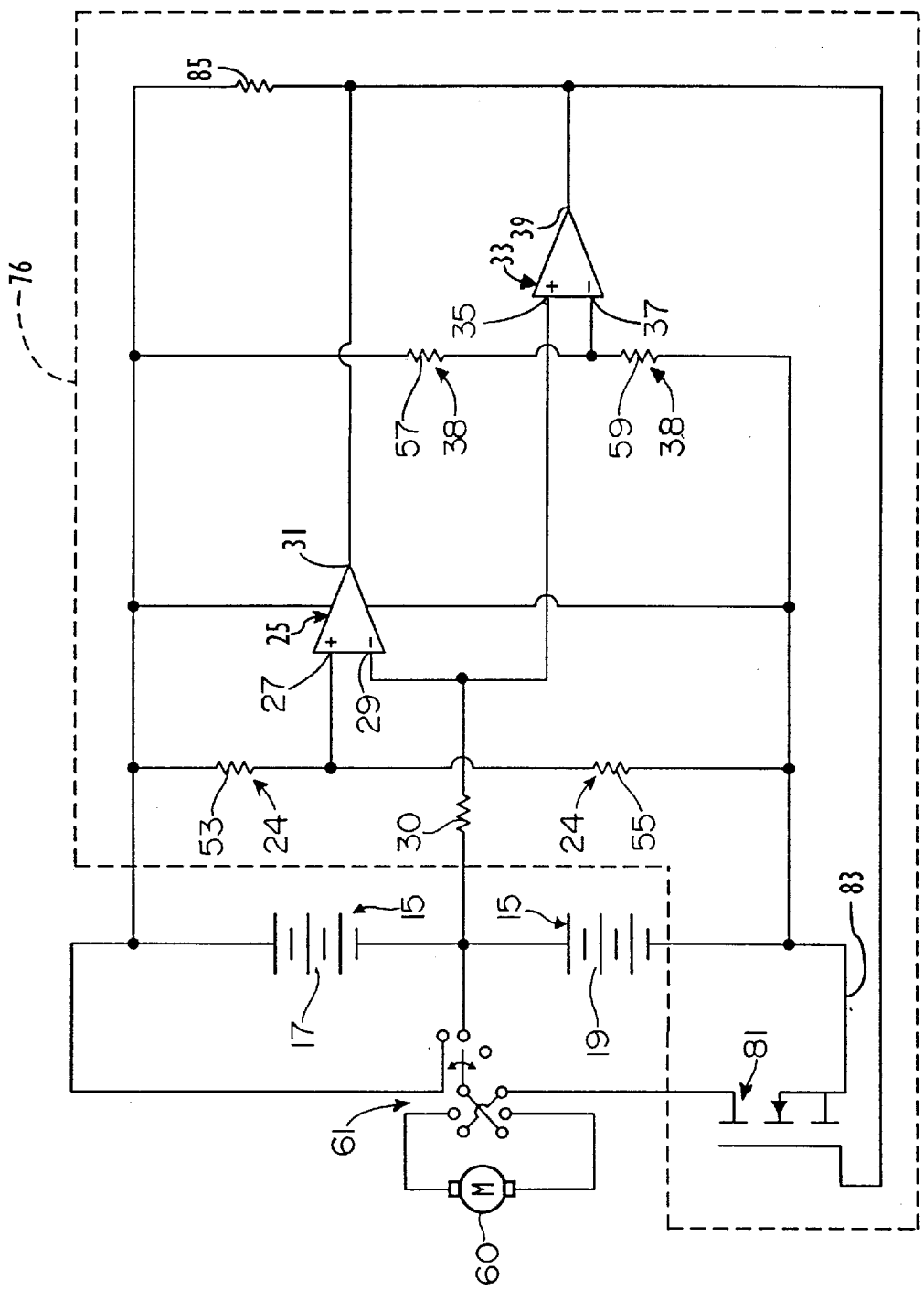
FIG. 5 shows an electrical schematic of a cordless device in accordance with a fifth embodiment of the present invention.

FIG. 5 shows a fifth embodiment of the present invention. The fifth embodiment is identical in construction and operation to the third embodiment (FIG. 3) except that in FIG. 3 disabling means 65 (relay 67, 69, diode 73) of detection circuit 64 are replaced in detection circuit 76 (FIG. 5) by a FET 81 connected in series in the power supply/load circuit 83 and a gate drive resistor 85 connected to supply 15 and the outputs 31, 39 of comparators 25, 33. During normal operation of device 11, packs 17, 19 have a balanced state of charge and the outputs of comparators 25, 33 are set high. This provides a path from supply 15 through resistor 85 to raise the gate voltage of FET 81 to bias FET 81 conductive connecting supply 15 to load 13 for normal operation. When either comparator 25, 33 is reset low indicating an imbalance, the current through resist or 85 is diverted to the comparator that is set low. As a result, the gate of FET 81 is pulled low turning off FET 81 and opening the supply/load circuit 83.

In accordance with a second aspect of the present invention, detection circuits 23, 63, 64, 75, 76 may function as voltage comparator circuits that are connected to power supply 15 and compare the sum of the voltages of the first and second packs 17, 19 to the voltage of the second pack 19 and generate a signal when the difference between the volt age sum and second pack voltage exceeds a predetermined absolute value proportionate to the voltage sum. Such a voltage comparator circuit can be used to detect generally an imbalanced charge state. An imbalanced charge state may be due to one of packs 17, 19 being discharged and may also be due, for example, to one of the packs being defective. A defective pack may, for example, have a high impedance and a reduced output voltage.

It will appreciated by those skilled in the art that device 11 in accordance with the present invention provides a number of advantages. First, detection circuits 23, 63, 64, 75, 76 provide a means for readily providing a visual indication of a battery pack with an imbalanced state of charge or an automatic means for disabling operation of device 11. As a result, damage to packs 17, 19 through reverse charging can readily be avoided. Secondly, the detection circuits may be utilized as a voltage comparator circuit for comparing the sum of the voltages of the first and second battery packs 17, 19 to the voltage of one of the packs and generating a signal when the difference exceeds a predetermined absolute value proportionate to the voltage sum. The comparator circuit may be utilized to identify a defective pack in the same way as a discharged pack. A defective pack may, for example, be caused by a cell having a high impedance and a reduced output voltage.

It will be apparent to those skilled in the art, that various modifications and variations can be made in the illustrative embodiments of the present invention without departing from the scope or spirit of the invention. Thus, it is intended that the present invention cover these modifications and variations provided they come within the scope of the appended claims and their equivalents.

I claim:

1. A battery powered device for supplying power to a load comprising:

a power supply connectable to the load and comprising first and second batteries;

the first and second batteries being connected in series with the voltage of each battery being summed with the voltage of the other battery to provide a summed voltage for application to the load;

a first voltage divider circuit across which is established a first voltage representative of the summed voltage and across a portion of which is established a second voltage representative of the voltage of the first battery;

a second voltage divider circuit across which is established a third voltage representative of the summed voltage and across a portion of which is established a fourth voltage representative of the voltage of the second battery;

a battery-connection circuit connected between the first and second batteries for establishing voltage levels representative of the actual voltage of the first and second batteries; and a voltage detection circuit, connected to the first voltage divider circuit, the second voltage divider circuit and the battery-connection circuit, for detecting that the first battery is charged and the second battery is substantially discharged when the voltage of the second battery exceeds the voltage of the first battery by a first predetermined amount proportional to the summed voltage, and for detecting that the second battery is charged and the first battery is substantially discharged when the voltage of the first battery exceeds the voltage of the second battery by a second predetermined amount proportional to the summed voltage.

2. The device of claim 1 wherein:

the detection circuit comprises a first comparator having (a) a positive input (i) connected to the first voltage divider circuit and (ii) receiving a voltage input proportional to the sum of the voltages of the first and second batteries and (b) a negative input (i) connected to the second battery and (ii) receiving a voltage input proportional to the voltage of the second battery; and the first comparator generates a first output signal when the voltage of the second battery exceeds the voltage of the first battery by the first predetermined amount proportionate to the summed voltage.

3. The device of claim 2 wherein:

the detection circuit comprises a second comparator having (a) a positive input (i) connected to the first battery and (ii) receiving a voltage input proportional to the voltage of the first battery and (b) a negative input (i) connected to the second voltage divider circuit and (ii) receiving a voltage input proportional to the sum of the voltages of the first and second batteries; and the second comparator generates a second output signal when the voltage of the first battery exceeds the voltage of the second battery by the second predetermined amount proportionate to the summed voltage.

4. The device of claim 3 wherein the detection circuit comprises a first indicator connected to the output of the first comparator to signal that the first battery is substantially discharged responsive to the second output signal.

5. The device of claim 4 wherein the detection circuit comprises a second indicator connected to the output of the second comparator to signal that the second battery is substantially discharged responsive to the second output signal.

6. The device of claim 5 wherein the first and second indicators are first and second LEDs.

7. The device of claim 3 wherein:

the first divider circuit attenuates the voltage input to the first comparator positive input to transition from greater than to less than the voltage input to the first comparator negative input when the voltage of the second battery exceeds the voltage of the first battery by the predetermined amount; and the second divider attenuates the voltage input to the second comparator negative input to transition from less than to greater than the voltage input to the second comparator positive input when the voltage of the first battery exceeds the voltage of the second battery by the predetermined amount.

8. The device of claim 4 wherein the first indicator is connected to the output of the second comparator to signal that the second battery is substantially discharged responsive to the second output signal.

9. The device of claim 8 wherein the first indicator is an LED.

10. The device of claim 8 wherein the first indicator is a means for disabling operation of the device.

11. The device of claim 10 wherein the disabling means is a relay for open circuiting the load and power supply circuit.

12. The device of claim 11 wherein the disabling means comprises:

a transistor and current limiting resistor connected in circuit with the first and second comparator outputs and the relay; and the current flowing to the first and second comparator outputs being limited to the emitter-base current of the transistor and the current flowing through the relay being conducted through the emitter-collector circuit of the transistor.

13. The device of claim 10 wherein:

the disabling means is a FET connected in the power supply and load circuit;

the outputs of the first and second comparators are connected in circuit with the gate of the FET;

the comparators during normal operation of the device are set high allowing a pull up resistor to raise the gate voltage of the FET thereby turning the FET on;

the comparators, upon detecting that the batteries have an imbalanced state of charge and that one battery is substantially discharged, provide a low output from one of the comparators to bias the gate of the FET to a low voltage and thereby turn the FET off.

14. A battery powered device for supplying power to a load comprising:

a power supply connectable to the load and comprising first and second batteries which are connected in series;

a first voltage divider circuit connected across the series-connected first and second batteries;

a second voltage divider circuit connected across the series-connected first and second batteries; and a voltage comparator circuit connected to the first and second voltage divider circuits and to a juncture between the first and second batteries for generating a signal (a) when the first battery is charged and the second battery is substantially discharged and (b) when the second battery is charged and the first battery is substantially discharged.

15. The device of claim 14 wherein the detection circuit comprises:

a first comparator having (a) a positive input (i) connected in circuit with the first and second batteries and (ii) receiving a voltage input proportional to the sum of the voltages of the first and second batteries and (b) a negative input (i) connected to the second battery and (ii) receiving a voltage input proportional to the voltage of the second battery;

the first comparator generating a first output signal when the voltage of the second battery exceeds the voltage of the first battery by a first predetermined amount proportionate to the voltage sum;

a second comparator having (a) a positive input (i) connected in circuit with the second battery and (ii) receiving a voltage input proportional to the voltage of the second battery and (b) a negative input (i) connected to the first and second batteries and (ii) receiving a voltage input proportional to the sum of the voltages of the first and second batteries; and the second comparator generating a second output signal when the voltage of the first battery exceeds the voltage of the second battery by a second predetermined amount proportionate to the voltage sum.

16. A battery powered device for supplying power to a load comprising:

a power supply connectable to the load and comprising first and second batteries which are connected in series;

a first voltage divider circuit connected across the series-connected first and second batteries;

a second voltage divider circuit connected across the series-connected first and second batteries; and a voltage comparator circuit, connected to the first and second voltage divider circuits and to a juncture between the first and second batteries, for comparing the sum of the voltages of the first and second batteries to the voltage of the second battery and generating an output signal when the difference between the voltage sum and the second battery exceeds a predetermined absolute value proportionate to the voltage sum.

17. The device of claim 16 wherein the voltage comparator circuit comprises:

a first comparator for generating the output signal when the second battery voltage exceeds the first battery voltage by the predetermined value, and a second comparator for generating the output signal when the first battery voltage exceeds the second battery voltage by the predetermined value.

18. The device of claim 17 wherein the voltage comparator circuit further comprises an indicator connected to the outputs of the first and second comparators for generating a user identifiable signal responsive to the output signal from the first and second comparators.

19. The device of claim 18 wherein the indicator is an LED providing a visual user identifiable signal.

20. The device of claim 18 wherein the indicator is a means for disabling operating of the device.

21. The device of claim 20 wherein the disabling means includes a relay for disabling operation of the device.

22. The device of claim 20 wherein the disabling means is a solid state switch for disabling operation of the device.

23. The device of claim 16 wherein the predetermined value corresponds to the difference in voltage between the batteries when one is charged and the other is discharged.

24. The device of claim 16 wherein the voltage comparator circuit comprises:

a first comparator having (a) a positive input (i) connected in circuit with the first and second batteries and (ii) receiving a voltage input proportional to the sum of the voltages of the first and second batteries and (b) a negative input (i) connected to the second battery and (ii) receiving a voltage input proportional to the voltage of the second battery;

the first comparator generating a first output signal when the voltage of the second battery exceeds the voltage of the first battery by a first predetermined amount proportionate to the voltage sum;

a second comparator having (a) a positive input (i) connected in circuit with the second battery and (ii) receiving a voltage input proportional to the voltage of the second battery and (b) a negative input (i) connected to the first and second batteries and (ii) receiving a voltage input proportional to the sum of the voltages of the first and second batteries; and the second comparator generating a second output signal when the voltage of the first battery exceeds the voltage of the second battery by a second predetermined amount proportionate to the voltage sum.

* * * * *